US008302506B2

(12) United States Patent
Iwata et al.

(10) Patent No.: US 8,302,506 B2
(45) Date of Patent: Nov. 6, 2012

(54) POWER TRANSMISSION DEVICE

(75) Inventors: Shigetsugu Iwata, Toyota (JP); Tetsuya Kohno, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 83 days.

(21) Appl. No.: 12/740,036

(22) PCT Filed: Jan. 9, 2009

(86) PCT No.: PCT/JP2009/050604
§ 371 (c)(1),
(2), (4) Date: Apr. 27, 2010

(87) PCT Pub. No.: WO2009/091055
PCT Pub. Date: Jul. 23, 2009

(65) Prior Publication Data
US 2011/0041649 A1  Feb. 24, 2011

(30) Foreign Application Priority Data
Jan. 16, 2008 (JP) .................................. 2008-006963

(51) Int. Cl.
*F16H 57/04* (2010.01)
(52) U.S. Cl. ..................................................... 74/606 R
(58) Field of Classification Search ................ 74/606 R; 184/6.12, 11.1
See application file for complete search history.

(56) References Cited

U.S. PATENT DOCUMENTS

| 1,554,081 A * | 9/1925 | Garrett .......................... 184/6.12 |
| 3,625,310 A * | 12/1971 | Herrick ......................... 184/6.12 |
| 3,771,622 A | 11/1973 | Hyakumura |
| 4,630,711 A | 12/1986 | Levrai et al. |
| 4,721,184 A * | 1/1988 | Sowards ....................... 184/6.12 |
| 7,213,682 B2 * | 5/2007 | Gibson et al. ................. 184/6.12 |
| 2008/0045368 A1 | 2/2008 | Nishihara |

FOREIGN PATENT DOCUMENTS

| CN | 2651524 Y | 10/2004 |
| EP | 1 602 861 A1 | 12/2005 |

(Continued)

OTHER PUBLICATIONS

Office Action issued in German Patent Application No. 11 2009 000 097.5; mailed Oct. 28, 2011; with English-language translation.

(Continued)

*Primary Examiner* — Vicky Johnson
(74) *Attorney, Agent, or Firm* — Oliff & Berridge, PLC

(57) ABSTRACT

A power transmission device includes: a main case having an inside storing an oil; a drum carrying up the oil; and a partition wall partitioning the inside of the main case into a transmission gear housing containing the drum and a catch tank. An inner wall of the main case includes a down-extending portion extending down toward a feed opening of the catch tank, and extending toward the drum rather than along a vertical plane extending in the vertical direction as the down-extending portion extends downward, and a receding portion bordering on the down-extending portion and extending away from the drum from a bordering point where the receding portion borders on the down-extending portion.

6 Claims, 10 Drawing Sheets

FOREIGN PATENT DOCUMENTS

| | | |
|---|---|---|
| JP | U 47-22374 | 11/1972 |
| JP | U 54-79374 | 6/1979 |
| JP | U 58-1863 | 1/1983 |
| JP | A 62-258262 | 11/1987 |
| JP | A 63-158357 | 7/1988 |
| JP | U 6-14611 | 2/1994 |
| JP | A 2006-307908 | 11/2006 |
| JP | A 2007-92742 | 4/2007 |
| JP | 2008-057723 A | 3/2008 |
| WO | WO 2007/034619 A1 | 3/2007 |

OTHER PUBLICATIONS

Decision to Grant issued in Japanese Patent Application No. 2008-006963; mailed Aug. 23, 2011; with English-language translation.
International Search Report issued for International Application No. PCT/JP2009/050604 on Apr. 28, 2009.
Office Action mailed Jul. 4, 2012 in Chinese counterpart application No. 200980102351.0 (with translation).

* cited by examiner

ND DEVICE

TECHNICAL FIELD

The present invention relates to a power transmission device.

BACKGROUND ART

In order to reduce the oil agitation resistance and suppress generation of a useless power loss, various types of transmissions and the like mounted with a lubricating oil level adjustment device and a lubricating device for example have hitherto been proposed.

For example, a power transmission device for a vehicle disclosed in Japanese Patent Laying-Open No. 2006-307908 is mounted with a lubricating device. This vehicle power transmission device is provided with a casing for storing a gear lubricating oil in its inner bottom portion, a first catch tank for catching to store the oil carried up by a ring gear, and a second catch tank provided separately from the first catch tank for catching to store the oil carried up by a drive gear.

Further, a transfer case disclosed in Japanese Utility Model Laying-Open No. 6-14611 is mounted with a lubricating oil level adjustment device, and the transfer case includes an oil catcher on a casing inner wall on the high-speed gear side. The bottom of the catcher has a leak hole formed therein, so that the input shaft and the output shaft are sufficiently lubricated while low-speed rotations are made and, while high-speed rotations are made, the splashed-up lubricating oil is stored in the oil catcher to lower the oil level and thereby suppress over-agitation of the lubricating oil by the gear.

In a crankcase lubricating structure for a V-type internal combustion engine disclosed in Japanese Patent Laying-Open No. 2007-92742, an oil that have collected in a bottom portion of a crankcase is discharged by means of movements of a connecting rod.

DISCLOSURE OF THE INVENTION

In the vehicle power transmission device disclosed in Japanese Patent Laying-Open No. 2006-307908 and the transfer case, the oil carried up by the gear or the like is caught by the oil tank or oil catcher, and further, even the oil dropping in the housing case containing the gear or the like, or flowing down along the inner surface of the housing case is also caught by the oil tank or oil catcher. As for the oil, the oil has a low temperature and has a high viscosity when the engine is started. Therefore, it takes some time for the oil pumped up by an oil pump to return to the bottom portion of the housing case, and accordingly the oil level in the housing case becomes lower. Thus, when the oil has a low viscosity and even the oil dropping in the housing case or flowing down along the inner surface of the housing case is caught by the oil tank or oil catcher for example, the oil level becomes lower and accordingly the oil level could become lower than an inlet of a strainer provided at the bottom of the housing case.

The present invention has been made in view of the problems as described above. An object of the present invention is to provide a power transmission device that in operation can reduce the oil agitation resistance while a rotating body such as gear is rotationally driven, and can prevent the oil level from becoming too low.

A power transmission device according to the present invention includes: a casing having an inside storing an oil; a rotating body provided rotatably in the casing and rotating while carrying up the oil; and a partition wall partitioning the inside of the casing into a rotating body housing containing the rotating body and an oil storing chamber capable of receiving the oil carried up by the rotating body, being adjacent to the rotating body housing, and located lower than a rotational axis of the rotating body. The partition wall defines a feed opening for feeding the oil into the oil storing chamber, the feed opening being defined lower in position than the rotational axis of the rotating body. An inner wall of the casing includes a down-extending portion and a receding portion. The down extending portion extends down toward the feed opening and, as the down-extending portion runs downward, the down-extending portion extends toward the rotating body rather than along a virtual vertical plane extending in a vertical direction. The receding portion borders on the down-extending portion and extends away from the rotating body from a bordering point where the receding portion and the down-extending portion border on each other. The partition wall includes an opening-defining wall portion located directly below the bordering point where the down-extending portion and the receding portion border on each other, and defining the feed opening together with a part of the inner wall where the bordering point is located. The opening-defining wall portion extends upward and extends away from the rotating body from a part located directly below the bordering point.

Preferably, a distance between the down-extending portion and the rotating body is smaller than a distance between the partition wall and the rotating body. Preferably, the down-extending portion extends along a virtual circle whose center is the rotational axis. Preferably, the down-extending portion protrudes closer to the rotating body, relative to a portion that is a part of the inner wall, located lower than the rotational axis and located opposite to the feed opening with respect to the down-extending portion. The inner wall includes a protruding portion defined by the down-extending portion and the receding portion and protruding toward the rotating body.

Preferably, a distance between the protruding portion and the rotating body is smaller than a distance between the rotating body and a part of the inner wall that is located higher than the protruding portion. Preferably, the power transmission device further includes a strainer disposed in a lower portion of the rotating body housing and capable of removing a foreign material in the oil. The oil storing chamber is located higher than the strainer.

The power transmission device according to the present invention in operation can reduce the agitation resistance of the oil for a rotating body such as gear and can prevent the oil level from becoming too low.

BEST MODES FOR CARRYING OUT THE INVENTION

A power transmission device according to an embodiment of the present invention will be described with reference to FIGS. 1 to 10. It should be noted that, where any number, quantity or the like is referred to in the embodiments described below, the scope of the present invention is not necessarily limited to the number, quantity or the like unless otherwise specified. Further, each element in the following embodiments is not necessarily requisite for the present invention unless otherwise specified. Furthermore, where a plurality of embodiments are illustrated below, it is originally intended that respective features of the embodiments may be combined as appropriate. A power transmission device in the present embodiment refers to an automatic transmission for an automobile. The automobile in the present embodiment refers to an FF layout automobile having its engine placed on the front side of the body and its front wheels operating as drive wheels.

Figure 1:
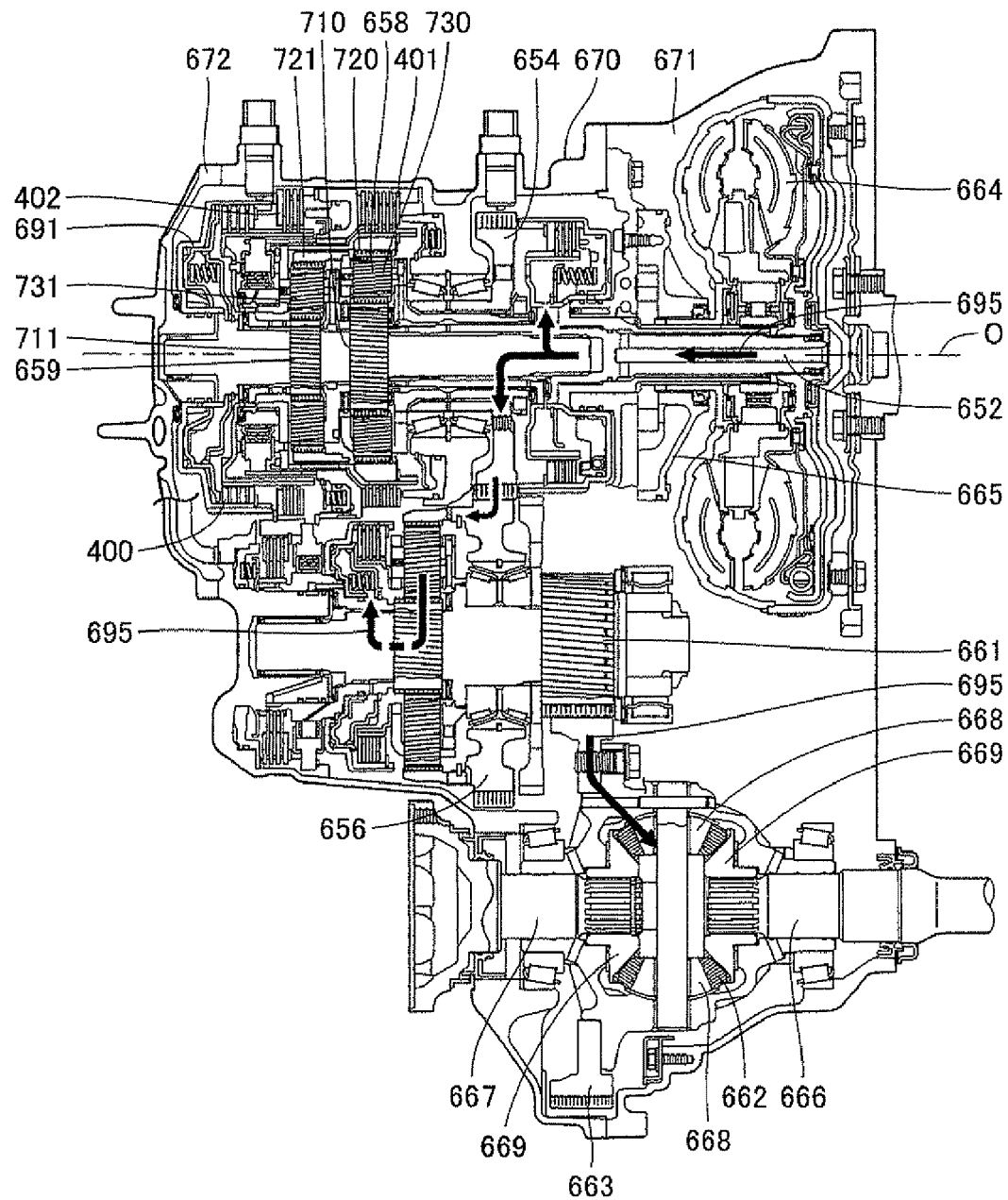
FIG. 1 is a schematic cross-sectional view of an automatic transmission in an embodiment of the present invention.

FIG. 1 is a schematic cross-sectional view of an automatic transmission in the embodiment of the present invention. The schematic cross-sectional view in FIG. 1 corresponds to a cross section of the automatic transmission along line I-I in FIG. 3. The automatic transmission includes an input shaft 652 to which a rotational force is input. The rotational force that is input to input shaft 652 is transmitted to each gear as indicated by an arrow 695 and output from driveshafts 666, 667.

The automatic transmission includes a rear planetary gear train 659, a front planetary gear train 658 and a counter drive gear 654 disposed on input shaft 652. The planetary gear trains include gears for changing the speed and power.

Front planetary gear train 658 includes a sun gear 710 provided rotatably about input shaft 652, a plurality of pinion gears 730 meshing with teeth formed on the outer circumference of sun gear 710 and rotating along the outer circumference of sun gear 710, and a ring gear 720 provided on the outer circumference side of pinion gears 730 and meshing with each pinion gear 730.

Rear planetary gear train 659 also includes a sun gear 711 provided rotatably about input shaft 652, a plurality of pinion gears 731 provided on the outer circumference of sun gear 711 and meshing with sun gear 711, and an annular ring gear 721 provided on the outer circumference side of pinion gears 731 and meshing with each pinion gear 731.

The automatic transmission includes a clutch 400 changing connections between the gears that are components of rear planetary gear train 659 and front planetary gear train 658 to change the speed and power, and includes a brake 401 and a brake 402 for stopping the rotations of the gears.

The automatic transmission includes a drum 691 connected to clutch 400 and connected to input shaft 652. Drum 691 rotates about a rotational axis O of input shaft 652, and is provided on the outer circumference of clutch 400 and formed in the shape of a bottomed cylinder.

The automatic transmission includes a counter driven gear 656 disposed to mesh with counter drive gear 654. On the shaft on which counter driven gear 656 is disposed, a differential drive pinion 661 is disposed. Differential drive pinion 661 is disposed adjacently to counter driven gear 656.

The automatic transmission includes a differential 662. Differential 662 includes a ring gear 663 as a second gear. Ring gear 663 is disposed to mesh with differential drive pinion 661. Differential 662 includes a pinion gear 668 rotating together with ring gear 663. Differential 662 includes a side gear 669 disposed to mesh with pinion gear 668. Side gear 669 rotates to transmit the rotational force to driveshafts 666, 667.

The automatic transmission includes an oil pump 665 disposed on the axis of input shaft 652. Oil pump 665 is formed to be able to pump up an oil stored in an oil pan 673 of a main case 670 described hereinlater.

The automatic transmission includes a torque converter 664 on the axis of input shaft 652. Torque converter 664 is formed to be able to transmit the rotational force of the engine to input shaft 652.

Figure 2:
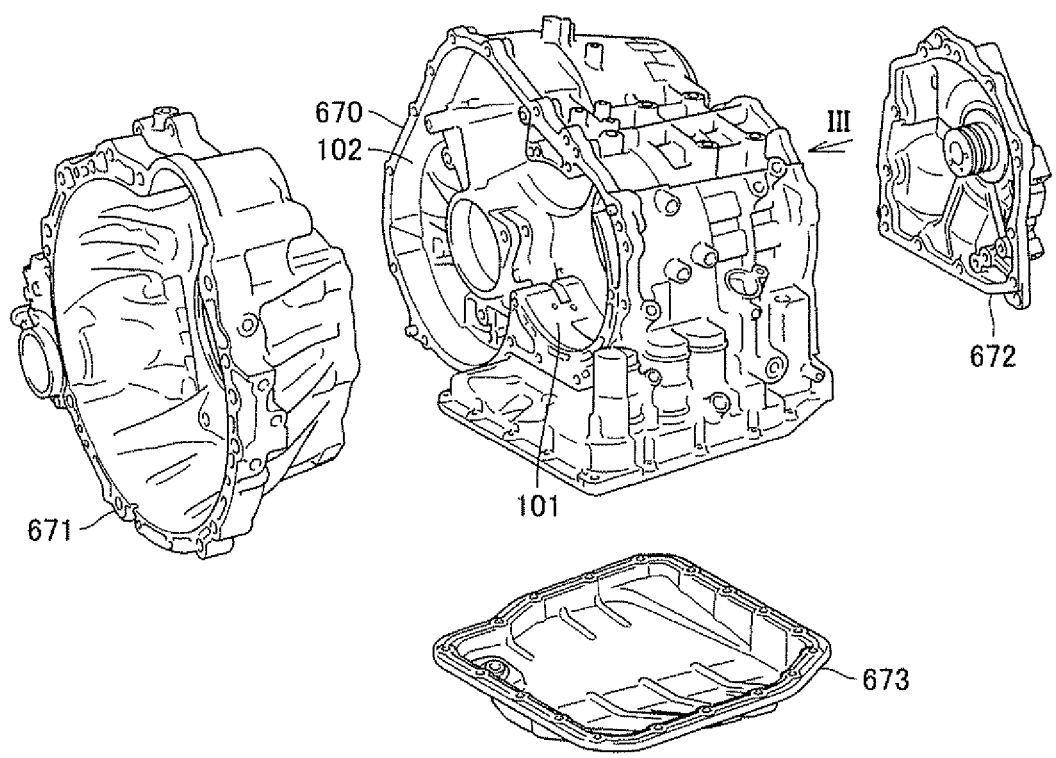
FIG. 2 is a schematic exploded perspective view of a casing of the transmission in the embodiment of the present invention.

FIG. 2 shows a schematic exploded perspective view of a casing of the transmission in the embodiment of the present invention. Referring to FIGS. 1 and 2, the transmission in the present embodiment includes main case 670. In main case 670, planetary gear trains such as front planetary gear train 658 and rear planetary gear train 659, as well as gears such as counter driven gear 656 and differential 662 for example are disposed.

On the engine-side end of main case 670, a torque converter housing 671 is disposed. Torque converter 664 is disposed in torque converter housing 671. On the end opposite to the engine side of main case 670, a rear cover 672 is disposed. On the lower side of main case 670, oil pan 673 for storing the oil is disposed.

The oil in the present embodiment refers to an oil for the automatic transmission that is called ATF (Automatic Transmission Fluid). The oil in the present embodiment has the functions of driving gears for changing the speed and power, transmitting the rotational force of the engine in the torque converter, and providing lubrication for preventing seizure of mechanical elements such as gears, for example.

Figure 3:
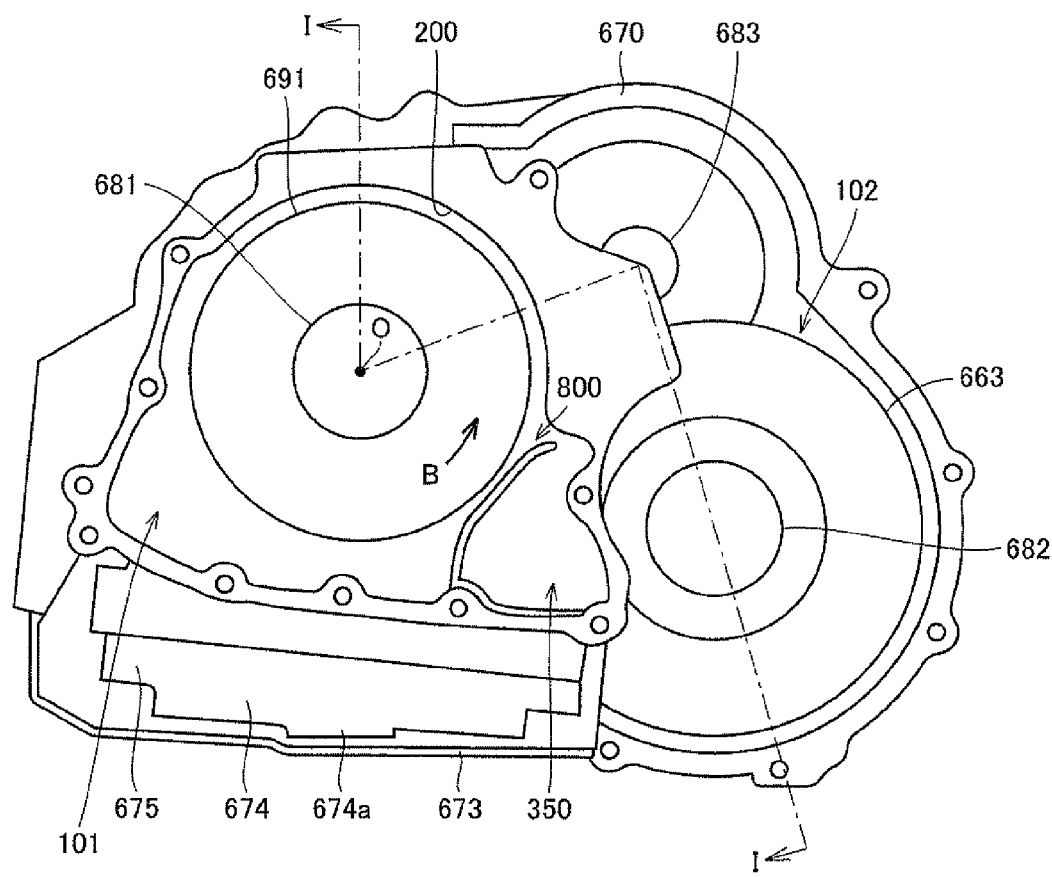
FIG. 3 is a front view as seen in the direction of an arrow III in FIG. 2.

FIG. 3 is a front view seen in the direction of an arrow III in FIG. 2. Referring to FIGS. 2 and 3, a transmission gear housing 101, a differential gear housing 102 and a catch tank 350 are defined in main case 670.

Transmission gear housing 101 is a housing containing drum 691, front planetary gear train 658 and rear planetary gear train 659 for example. Drum 691 has the largest diameter relative to front planetary gear train 658 and rear planetary gear train 659 contained in transmission gear housing 101.

Transmission gear housing 101 includes oil pan 673 in its bottom portion. Oil pan 673 is formed in the shape of a box whose upper side is opened. Transmission gear housing 101 is formed to be able to store the oil in its bottom portion.

The automatic transmission includes differential gear housing 102 as a second gear housing. Differential gear housing 102 is formed to contain the second gear different from a first gear which is ring gear 721. The second gear in the present embodiment refers to ring gear 663 of differential 662 for example.

In differential gear housing 102 of the present embodiment, a plurality of gears of differential 662 are disposed. The bottom portion of differential gear housing 102 is formed along the shape of ring gear 663 that is one of the gears of differential 662. Differential gear housing 102 is formed to be able to store the oil in its bottom portion.

In transmission gear housing 101, a main shaft 681 that is the axis of input shaft 652 is inserted. In differential gear housing 102, a differential shaft 682 corresponding to the axis of driveshafts 666, 667 connected to differential 662 is inserted. Above differential shaft 682, a counter shaft 683 that is the shaft of counter driven gear 656 and differential drive pinion 661 is inserted.

The automatic transmission includes a strainer 674. Strainer 674 is formed to remove any foreign material from the oil. Strainer 674 includes an oil inlet 674a. Inlet 674a is disposed at the bottom of oil pan 673. The automatic transmission includes a valve body 675 disposed on the upper side of strainer 674. Valve body 675 is formed to be able to control switching of meshing relations between gears for changing the speed and power. Valve body 675 is also formed to be able to control engagement of the clutch in the transmission.

Figure 4:
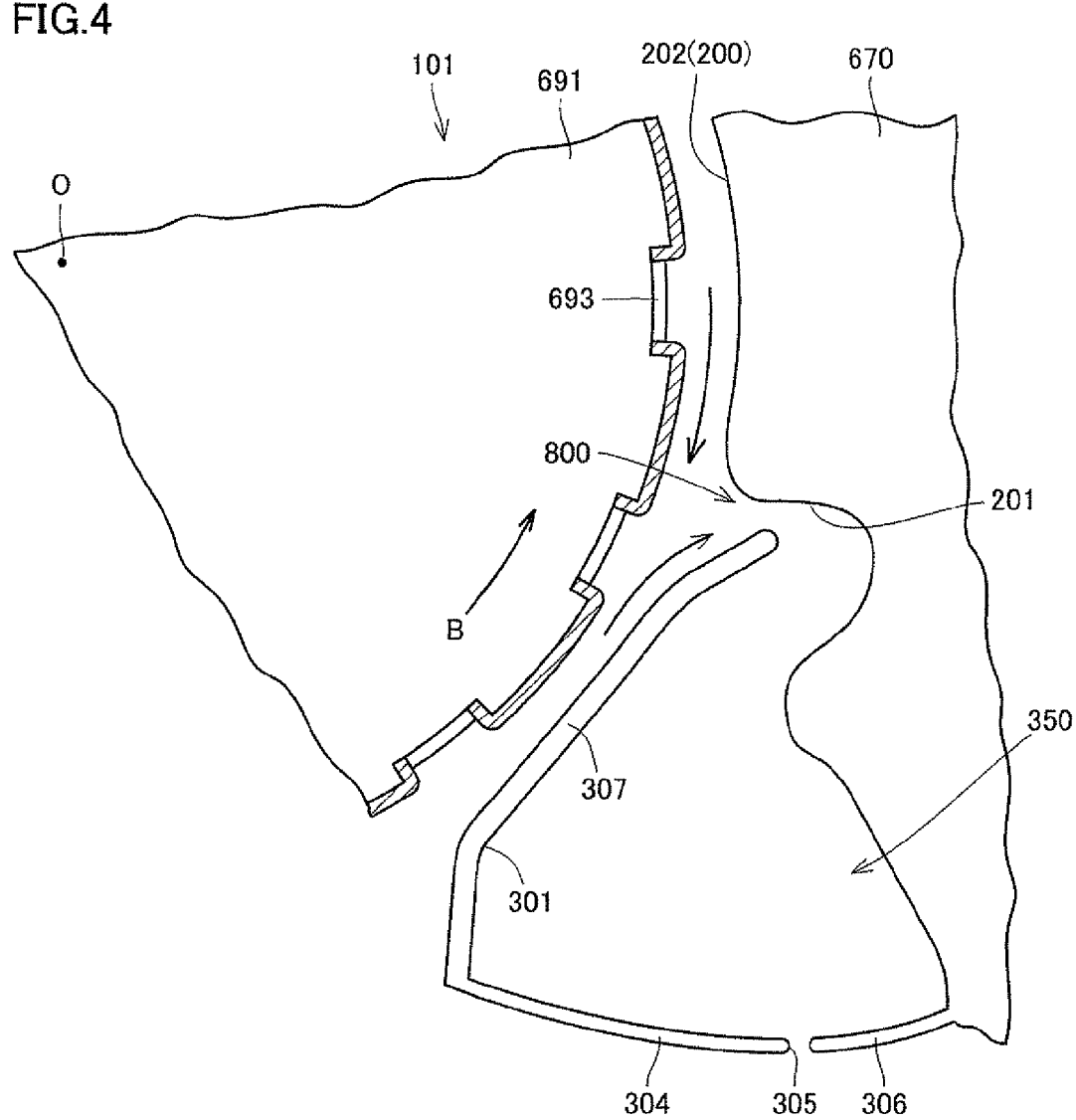
FIG. 4 is an enlarged front view showing a part of FIG. 3 in an enlarged state to illustrate a catch tank and its neighborhood.

FIG. 4 is an enlarged front view showing a part of FIG. 3 in an enlarged state to illustrate catch tank 350 and its neighborhood. As shown in FIG. 4, a partition wall 301 is provided to partition the inside of main case 670 into catch tank 350 and transmission gear housing 101. Catch tank 350 is located lower than rotational axis O of drum 691, and is disposed to be adjacent to differential gear housing 102 side, with respect to transmission gear housing 101.

Partition wall 301 is disposed away from an inner wall 200 of main case 670 toward drum 691, and defines catch tank 350 in main case 670, together with inner wall 200 of main case 670.

Partition wall 301 includes a sidewall portion 307 extending in the direction of the height of the automatic transmission and defining a feed opening 800 for guiding the oil into catch tank 350, and a bottom wall portion 304 having one end connected to the lower end of sidewall portion 307 and the other end connected to inner wall 200 of main case 670. Feed opening 800 communicates with catch tank 350, and feed opening 800 is located lower than rotational axis O.

In bottom wall portion 304, a communication hole 305 allowing catch tank 350 and transmission gear housing 101 to communicate with each other is formed, such that the oil in catch tank 350 can be discharged to transmission gear housing 101.

Figure 5:
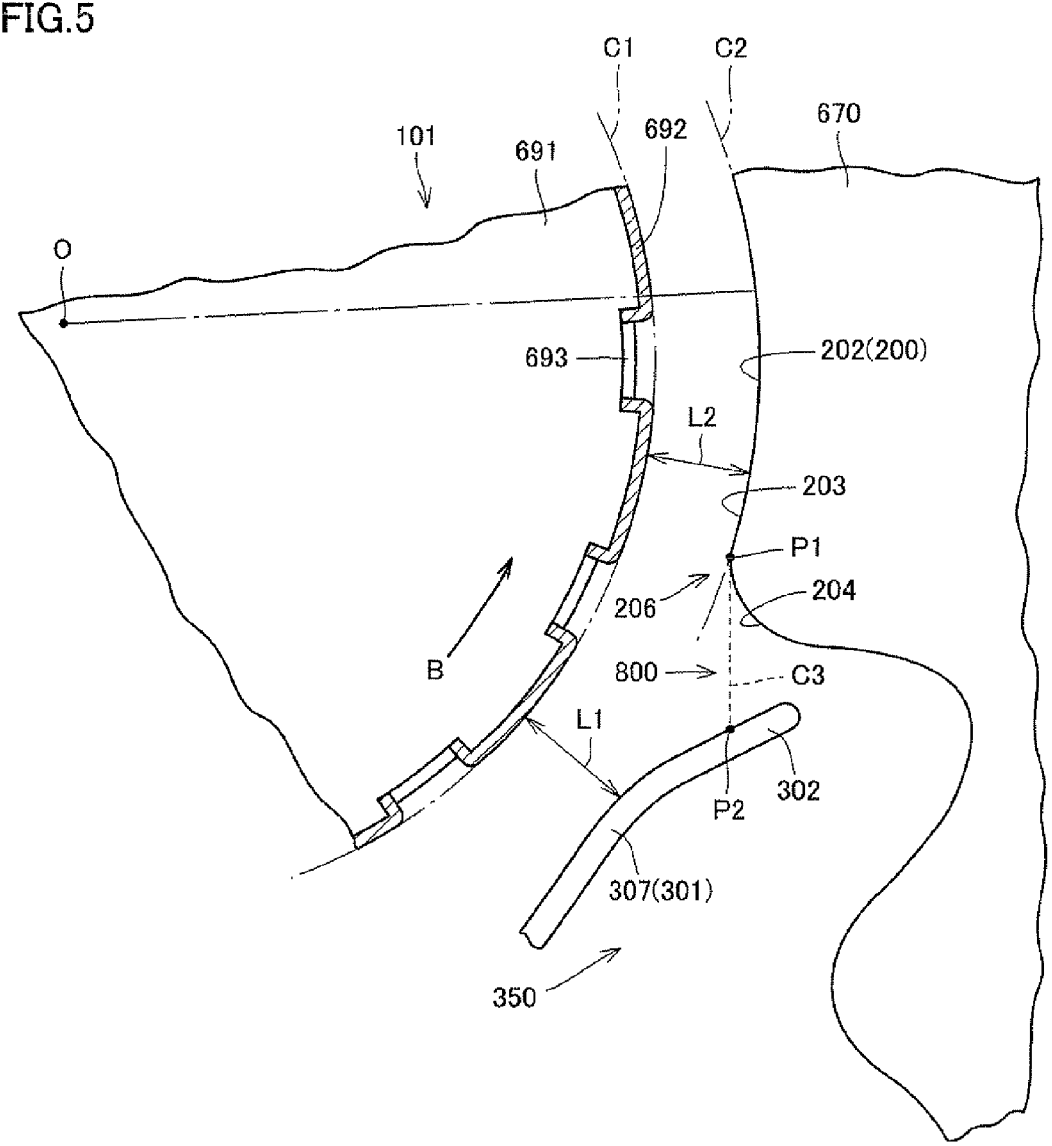
FIG. 5 is a front view showing a structure of a feed opening and its neighborhood in detail.

FIG. 5 is a front view showing in detail a structure of feed opening 800 and its neighborhood. As shown in FIG. 5, drum 691 is provided rotatably about rotational axis O. Drum 691 is formed in the shape of a bottomed cylinder extending in the direction of rotational axis O. On the outer circumferential surface of drum 691, projections 692 extending in the direction of rotational axis O are arranged and spaced from each other in the circumferential direction. A through hole 693 is provided in a portion located between projections 692 on the outer circumferential surface of drum 691. Via through hole 693, the oil for clutch 400 for example located inside drum 691 is discharged.

The surface of projections 692 is a curve extending along a virtual circle C1 whose center is rotational axis O.

Inner wall 200 of main case 670 defining transmission gear housing 101 includes a portion 202 that is at least located higher than catch tank 350 and located on catch tank 350 side and differential gear housing 102 side with respect to rotational axis O, and this portion 202 is an arc-shaped wall portion 202 extending along a virtual circle C2 whose center is rotational axis O. Arc-shaped wall portion 202 extends along the surface of projections 692 of drum 691. In the automatic transmission of the present embodiment, arc-shaped wall portion 202 further extends from a portion located directly above rotational axis O toward the front side in rotational direction B.

Arc-shaped wall portion 202 is formed on inner wall 200, and accordingly main shaft 681 can be disposed close to ring gear 663 and differential shaft 682, so that the automatic transmission can be downsized.

Inner wall 200 also includes a down-extending portion 203 extending downward toward feed opening 800. The down-extending portion is adjacent to feed opening 800 and located on the upper side of the feed opening. In the automatic transmission of the present embodiment, down-extending portion 203 extends along virtual circle C2 whose center is rotational axis O, similarly to arc-shaped wall portion 202.

Since down-extending portion 203 is located lower than rotational axis O, down-extending portion 203 curves to protrude toward drum 691 side, as the down-extending portion runs downward.

Down-extending portion 203 has a lower end bordering on a receding portion 204. Receding portion 204 extends away from drum 691 as the receding portion runs downward from a bordering point P1 where down-extending portion 203 and receding portion 204 border on each other. In the present embodiment, receding portion 204 is also arc-shaped and bordering point P1 is a point of inflection of receding portion 204 and down-extending portion 203. The present invention, however, is not limited to this.

An upper end portion (opening-defining wall portion) 302 of sidewall portion 307 extends upward from a point P2 located directly below bordering point P1 and extends away from drum 691.

Feed opening 800 is defined by receding portion 204 and upper end portion 302. Specifically, feed opening 800 is defined by bordering point P1 where receding portion 204 and down-extending portion 203 border on each other, a part of partition wall 301 where point P2 is located, and rear cover 672 shown in FIGS. 1 and 2.

Figure 6:
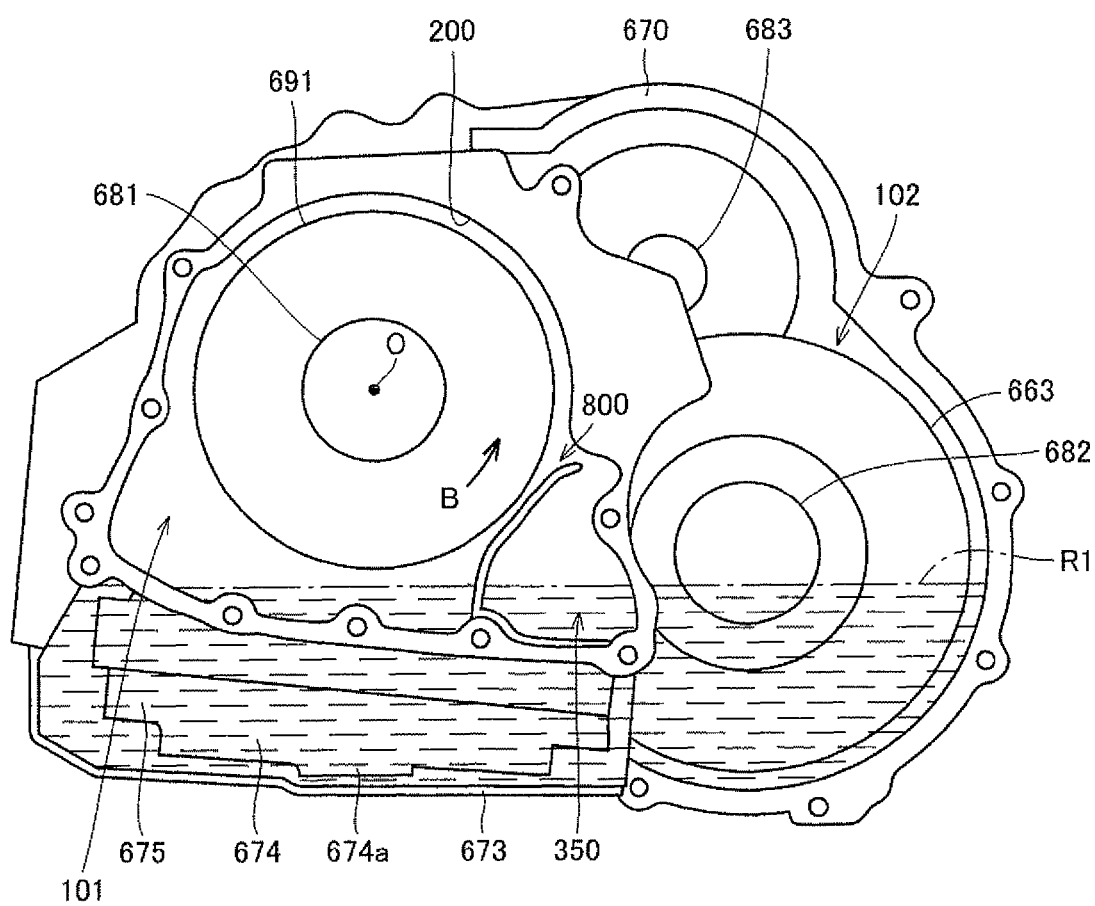
FIG. 6 is an exploded front view of the automatic transmission, showing a state where several minutes have passed since the time immediately after drive of the engine is stopped.

FIG. 6 is an exploded front view of the automatic transmission showing a state where several minutes have passed since the time immediately after drive of the engine is stopped.

As shown in FIG. 6, when drive of the engine is stopped and drive of oil pump 665 is also stopped, the oil pump-up operation by oil pump 665 is accordingly stopped. Further, the oil having been supplied to oil-supplied portions such as each gear, bearing, and clutch 400 shown in FIG. 1 is returned to oil pan 673. FIG. 6 shows the state where approximately several minutes have passed since the engine stop, and the oil having been supplied to the oil-supplied portions is not completely returned.

Figure 7:
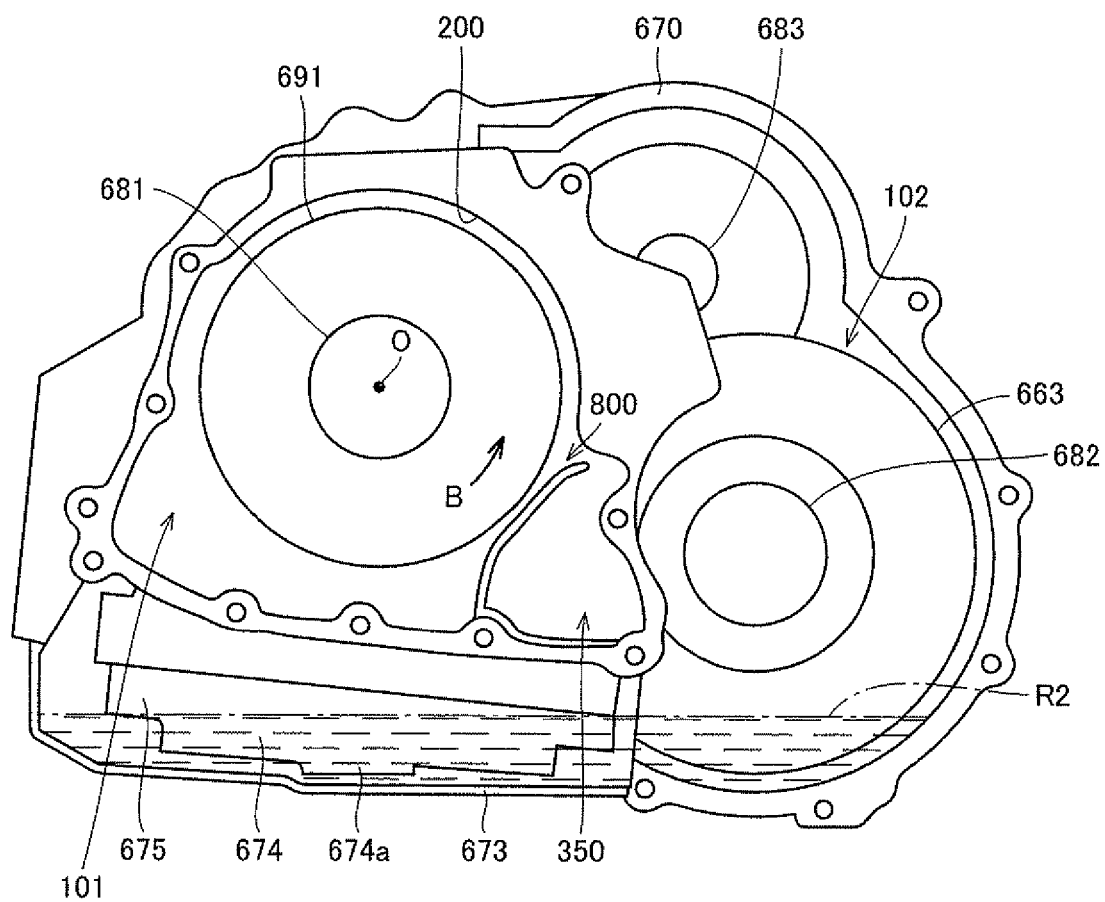
FIG. 7 is an exploded front view of the automatic transmission, showing a state where the engine having been stopped is driven.

FIG. 7 is an exploded front view of the automatic transmission, showing a state where the engine having been stopped is driven.

Referring to FIG. 7, when drive of the engine is stopped for some period of time, the oil temperature decreases and the oil viscosity increases. Therefore, immediately after the engine is driven that has been stopped for some time, the oil having been supplied to each oil-supplied portion does not easily return to oil pan 673, and accordingly an oil level R2 becomes lower than catch tank 350.

The oil supplied to clutch 400 for example shown in FIG. 1 is discharged via through hole 693 shown in FIG. 5 into transmission gear housing 101. A part of the oil discharged via through hole 693 is sprayed onto arc-shaped wall portion 202 to flow down along arc-shaped wall portion 202 or drop between drum 691 and arc-shaped wall portion 202.

The oil flowing down along arc-shaped wall portion 202 falls at bordering point P1 from arc-shaped wall portion 202 to drop downward. Since sidewall portion 307 is located directly below bordering point P1, the oil dropping from bordering point P1 falls on sidewall portion 307.

Since upper end portion 302 extends upward from point P2 of sidewall portion 307, the oil dropping on sidewall portion 307 can be prevented from entering catch tank 350 via feed opening 800.

Further, the oil dropping between arc-shaped wall portion 202 and drum 691 also drops onto sidewall portion 307 similarly. The oil dropping on sidewall portion 307 then flows down on sidewall portion 307 to be returned to oil pan 673.

Down-extending portion 203 extends along virtual circle C2 whose center is rotational axis O and is located lower than rotational axis O. Therefore, as down-extending portion 203 runs downward, down-extending portion 203 extends toward drum 691 rather than along a virtual vertical plane C3 extending in the vertical direction. Thus, the oil flowing down along down-extending portion 203 falls off from bordering point P1 in the direction of the tangent of down-extending portion 203. Accordingly, the oil flowing down along down-extending portion 203 falls off from bordering point P1 in the direction of the tangent of down-extending portion 203, rather than along receding portion 204 from bordering point P1. In this way, the oil flowing down along down-extending portion 203 can be prevented from running along receding portion 204 to enter catch tank 350.

Further, most of the oil flowing down along inner wall 200 of main case 670 toward feed opening 800 is the oil sprayed on a portion of arc-shaped wall portion 202 that is located on differential gear housing 102 side and catch tank 350 side with respect to the portion located directly above rotational axis O.

Here, arc-shaped wall portion 202 extends along on virtual circle C2 whose center is rotational axis O and, in a region near feed opening 800, arc-shaped wall portion 202 is located lower than rotational axis O. Accordingly, arc-shaped wall portion 202 located near feed opening 800 extends toward drum 691 rather than along the virtual vertical plane extending in the vertical direction, as the arc-shaped wall portion runs downward. Therefore, the oil flying off from bordering point P1 is sufficiently accelerated so that the oil flies toward drum 691 rather than downward in the vertical direction. Thus, the oil flowing down along on arc-shaped wall portion 202 runs away from inner wall 200 at bordering point P1 to fly off in the direction away from feed opening 800.

In this way, the oil flowing down along arc-shaped wall portion 202 and down-extending portion 203 is prevented from entering catch tank 350.

Even if the oil enters catch tank 350, the oil is returned into oil pan 673 as described above through communication hole 305, since communication hole 305 shown in FIG. 4 is located higher than strainer 674 and valve body 675.

Thus, in the process where the oil supplied to any oil-supplied portion such as clutch 400 is returned to oil pan 673, the oil can be prevented from being caught by catch tank 350. Therefore, the oil level in oil pan 673 can be prevented from becoming low. Accordingly, the oil level can be prevented from becoming lower than inlet 674a of strainer 674, and strainer 674 can be prevented from taking in the air.

Figure 8:
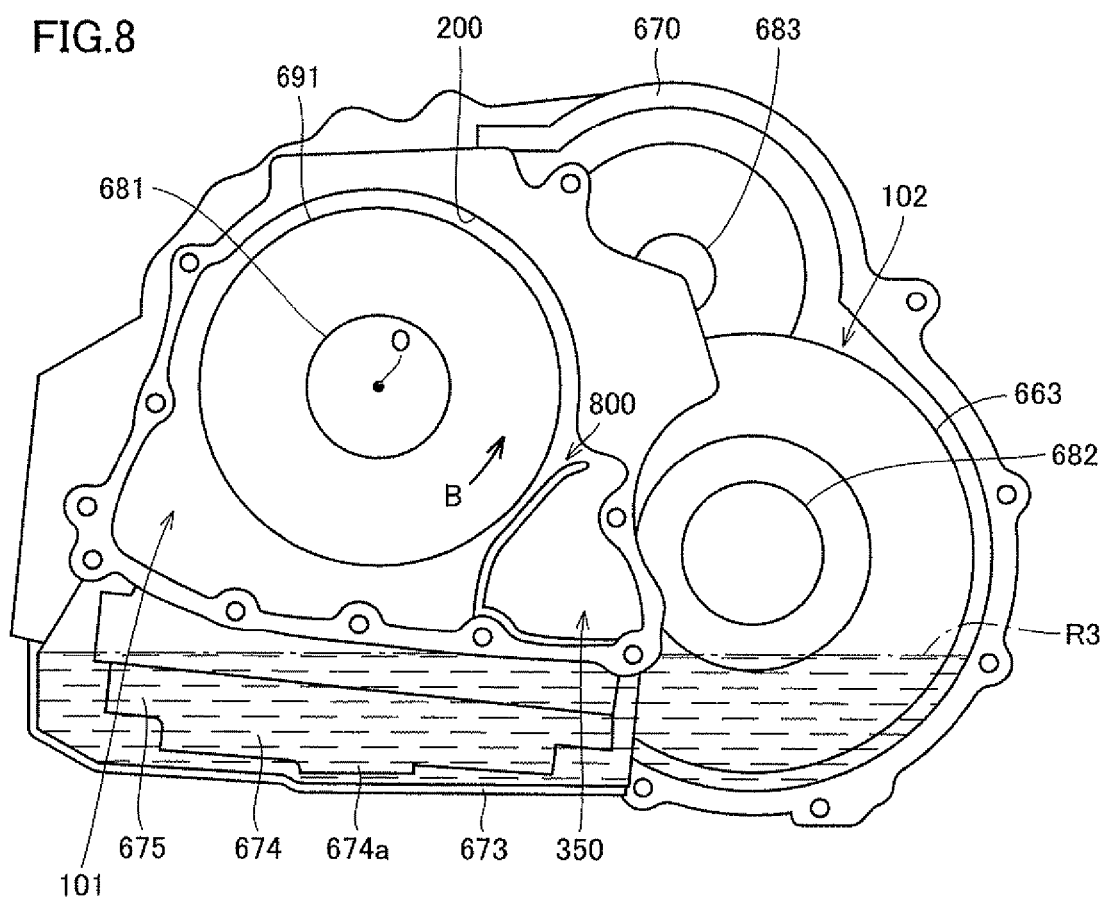
FIG. 8 is an exploded front view of the automatic transmission in a normal travel mode.

FIG. 8 is an exploded front view of the automatic transmission in a normal travel mode. As shown in FIG. 8, when a vehicle mounted with this automatic transmission travels in a normal mode, the oil temperature is higher than the oil temperature when the engine is started. The oil viscosity accordingly decreases. The oil once supplied by oil pump 665 to an oil-supplied portion is returned to oil pan 673 in a shorter period of time as compared with the time when the engine is started. Accordingly, oil level R3 in FIG. 8 is higher than oil level R2 in FIG. 7.

Figure 9:
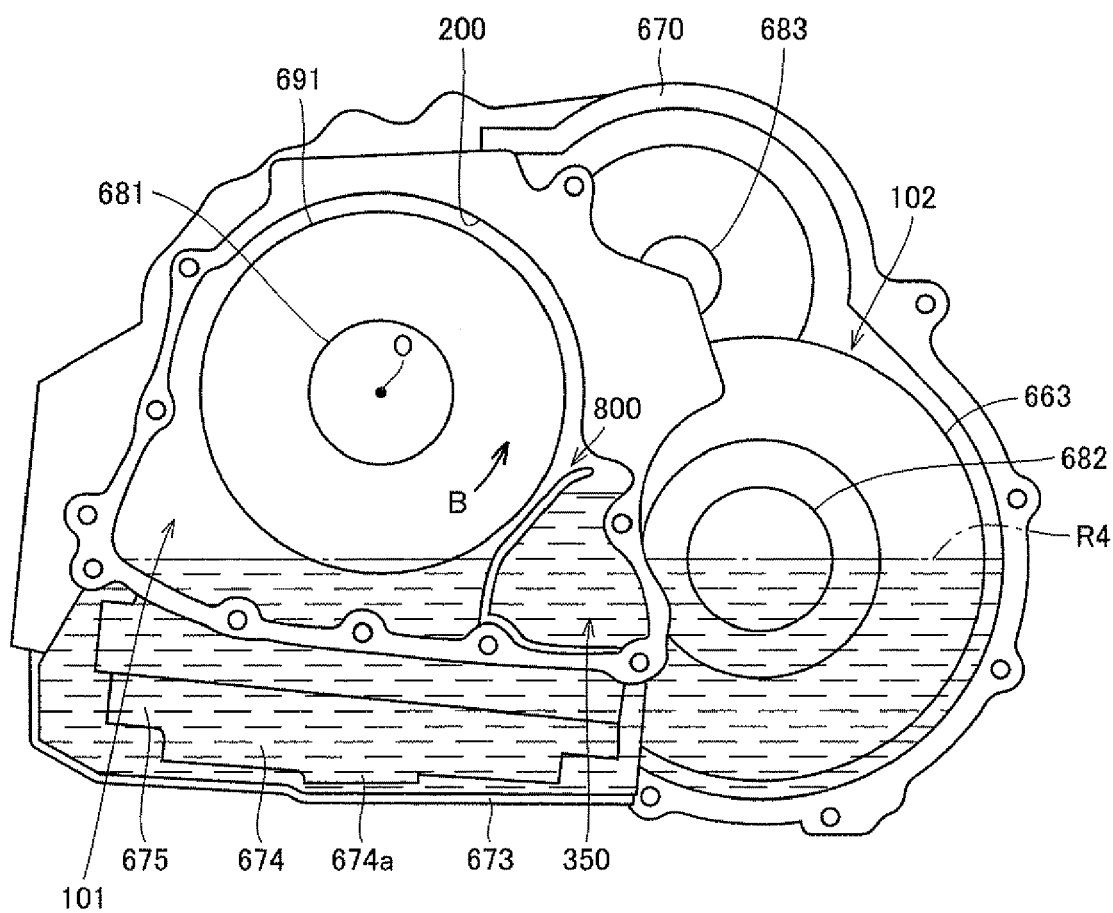
FIG. 9 is an exploded front view of the automatic transmission in a high-speed travel mode.

FIG. 9 is an exploded front view of the automatic transmission in a high-speed travel mode. In FIG. 9, when a vehicle mounted with this automatic transmission starts traveling at a higher speed than the normal travel mode shown in FIG. 8, the oil temperature becomes higher than the oil temperature in the normal travel mode and accordingly the oil viscosity decreases. Thus, the oil supplied to any oil-supplied portion returns to oil pan 673 in a shorter period of time than the normal travel mode.

Accordingly, in the high-speed travel mode, the oil level is higher than that in the normal travel mode. The higher oil level allows the oil stored in the bottom portion of transmission gear housing 101 to become contact with drum 691 and thus be carried up by drum 691.

The oil carried up by drum 691 runs through feed opening 800 to enter catch tank 350 and to be stored in catch tank 350. Thus, the oil can be prevented from returning into transmission gear housing 101, and the oil level in transmission gear housing 101 can be lowered. As the oil level in transmission gear housing 101 lowers, drum 691 can be prevented from contacting the oil stored in the bottom portion of transmission gear housing 101, and the oil agitation resistance in drum 691 can be reduced. The size of communication hole 305 is set such that the amount of oil returned per unit time from catch tank 350 into transmission gear housing 101 via communication hole 305 is smaller than the amount of oil supplied per unit time from feed opening 800 into catch tank 350.

Referring again to FIG. 5, a distance L2 from arc-shaped wall portion 202 and down-extending portion 203 to drum 691 is smaller than distance L1 between sidewall portion 307 and drum 691. Therefore, the oil carried up by drum 691 properly reaches feed opening 800 and runs through feed opening 800 to be stored in catch tank 350. In contrast, the portion between down-extending portion 203 and drum 691 is narrower. Therefore, the oil adhering to the surface of drum 691 is brought to touch receding portion 204 and to be dropped.

In particular, receding portion 204 and feed opening 800 are located, in rotational direction B, on the front side of the position of the level of the oil stored in transmission gear housing 101, and are further located lower than rotational axis O. Thus, the oil adhering to the surface of drum 691 can be dropped in an early stage. In this way, the oil adhering to the surface of drum 691 can be reduced and the rotational resistance of drum 691 can also be reduced. Accordingly, the drive efficiency of the engine can be improved. Moreover, since sidewall portion 307 curves away from drum 691 as the sidewall portion extends upward, the oil carried up by drum 691 can be properly guided to feed opening 800.

Figure 10:
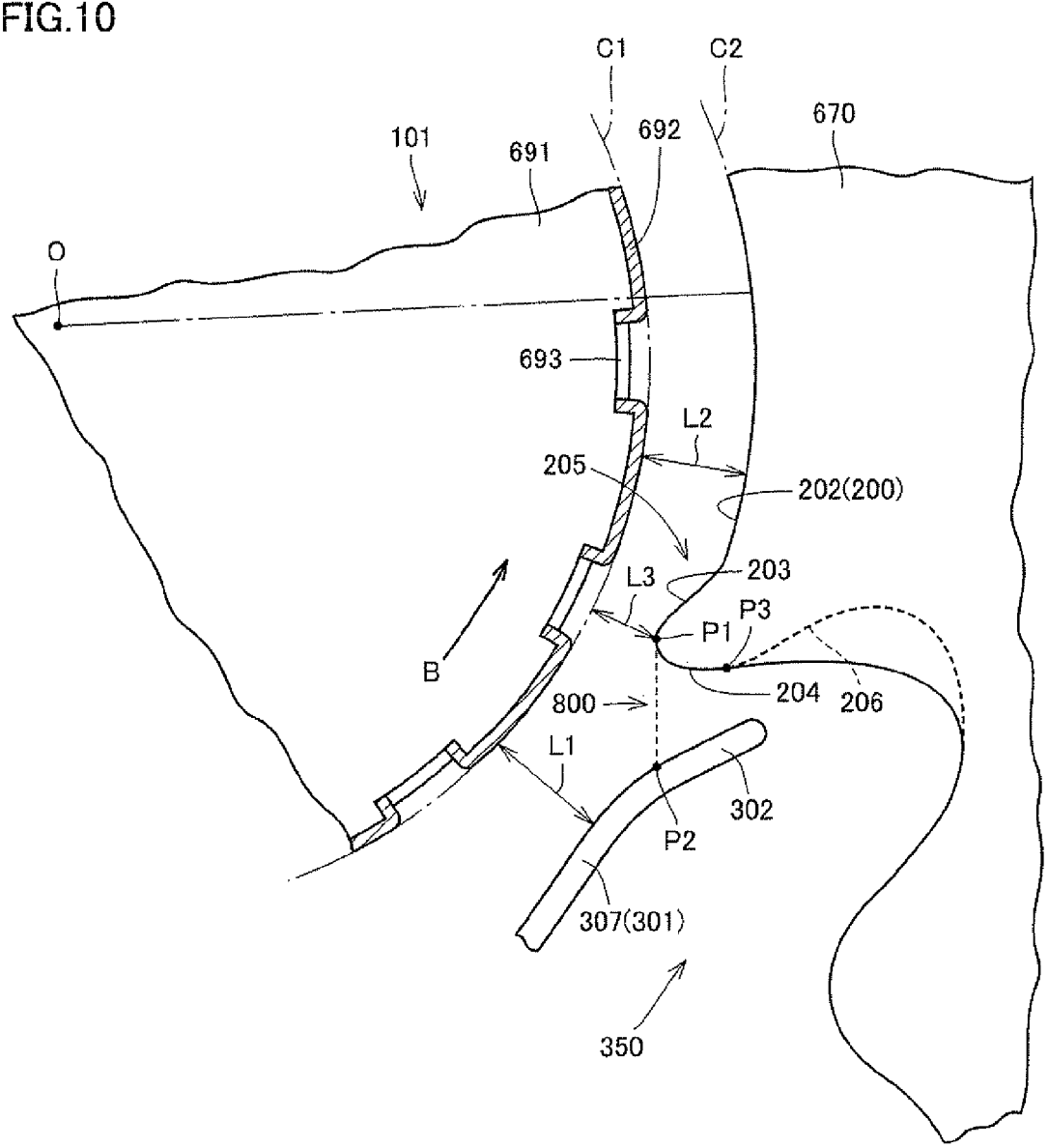
FIG. 10 is a partial cross-sectional front view showing a modification of a down-extending portion and a feed opening.

FIG. 10 is a partial cross-sectional front view showing a modification of down-extending portion 203 and feed opening 800.

As shown in FIG. 10, as down-extending portion 203 runs downward, down-extending portion 203 extends toward drum 691 from the bordering point between down-extending portion 203 and arc-shaped wall portion 202 which is adjacent to down-extending portion 203 on the opposite side to feed opening 800. The lower end of down-extending portion 203 borders on receding portion 204, and down-extending portion 203 and receding portion 204 define a protruding portion 205 protruding toward drum 691.

Accordingly, the oil flowing down along arc-shaped wall portion 202 is guided by down-extending portion 203 toward drum 691, and flies off at bordering point P1 toward drum 691. Thus, the oil flowing down on arc-shaped wall portion 202 can be prevented from entering catch tank 350 from feed opening 800.

In the example shown in FIG. 10 as well, partition wall 301 includes upper end portion 302 extending upward from the position directly below bordering point P1 and extending away from drum 691.

Since protruding portion 205 protrudes from arc-shaped wall portion 202 toward drum 691, a distance L3 between protruding portion 205 and drum 691 is smaller than distance L1. Thus, a considerable amount of oil can be caused to drop from the surface of drum 691, and accordingly the rotational resistance of drum 691 can be further reduced.

As indicated by the broken line in FIG. 10, an upper wall portion defining an upper portion of catch tank 350 may be formed as a bulging portion 206 bulging upward as the bulging portion runs from the end of receding portion 204 toward differential gear housing 102.

Here, upper end portion 302 extends further toward differential gear housing 102 with respect to the position directly below a bordering point P3 where bulging portion 206 and receding portion 204 border on each other.

Thus, even if a part of the oil flowing down along arc-shaped wall portion 202 passes through down-extending portion 203 and flows on the surface of receding portion 204, the oil can be caused to drop at bordering point P3 between receding portion 204 and bulging portion 206, and the dropping oil can be prevented from entering catch tank 350.

Regarding the above description of the embodiments of the present invention, it should be construed that the embodiments described herein are by way of illustration in all respects, not by way of limitation. It is intended that the scope of the present invention is defined by claims, and includes all modifications and variations equivalent in meaning and scope to the claims. Further, the above-referenced numerical values or the like are also by way of illustration, and the present invention is not limited to the above-referenced numerical values and ranges.

INDUSTRIAL APPLICABILITY

The present invention is applicable to a power transmission device, and particularly suitable for a transmission.

The invention claimed is:

1. A power transmission device comprising:
a casing having an inside storing an oil;
a rotating body provided rotatably in said casing in direct contact with stored oil and rotating while carrying up a portion of said stored oil; and
a partition wall partitioning the inside of said casing into a rotating body housing containing said rotating body and an oil storing chamber capable of receiving said oil carried up by said rotating body, being adjacent to said rotating body housing, and located lower than a rotational axis of said rotating body, wherein
said partition wall defines a feed opening for feeding the oil into said oil storing chamber, said feed opening being defined lower in position than the rotational axis of said rotating body,
an inner wall of said casing includes a down-extending portion and a receding portion, said down extending portion extends down toward said feed opening and, as said down-extending portion runs downward, said down-extending portion extends toward said rotating body rather than along a virtual vertical plane extending in a vertical direction, and said receding portion borders on said down-extending portion and extends away from said rotating body from a bordering point where said receding portion and said down-extending portion border on each other,
said partition wall includes an opening-defining wall portion located directly below said bordering point where said down-extending portion and said receding portion border on each other, and defining said feed opening together with a part of said inner wall where said bordering point is located, and
said opening-defining wall portion extends upward and extends away from said rotating body from a part located directly below said bordering point.

2. The power transmission device according to claim 1, wherein
a distance between said down-extending portion and said rotating body is smaller than a distance between said partition wall and said rotating body.

3. The power transmission device according to claim 1, wherein
said down-extending portion extends along a virtual circle whose center is said rotational axis.

4. The power transmission device according to claim 1, wherein
said down-extending portion protrudes closer to said rotating body, relative to a portion that is a part of said inner wall, located lower than said rotational axis and located opposite to said feed opening with respect to said down-extending portion, and
said inner wall includes a protruding portion defined by said down-extending portion and said receding portion and protruding toward said rotating body.

5. The power transmission device according to claim 4, wherein
a distance between said protruding portion and said rotating body is smaller than a distance between said rotating body and a part of said inner wall that is located higher than said protruding portion.

6. The power transmission device according to claim 1, further comprising a strainer disposed in a lower portion of said rotating body housing and capable of removing a foreign material in said oil, wherein
said oil storing chamber is located higher than said strainer.

* * * * *